(12) United States Patent
Manku

(10) Patent No.: US 9,178,731 B2
(45) Date of Patent: *Nov. 3, 2015

(54) TRANSMISSION APPARATUS FOR A WIRELESS DEVICE USING DELTA-SIGMA MODULATION

(71) Applicant: TAG-COMM INC., Waterloo (CA)

(72) Inventor: Tajinder Manku, Waterloo (CA)

(73) Assignee: TAG-COMM INC., Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/493,262

(22) Filed: Sep. 22, 2014

(65) Prior Publication Data
US 2015/0009018 A1    Jan. 8, 2015

Related U.S. Application Data

(63) Continuation-in-part of application No. 13/874,996, filed on May 1, 2013.

(60) Provisional application No. 61/670,259, filed on Jul. 11, 2012.

(51) Int. Cl.
*H04L 27/04* (2006.01)
*G01S 13/75* (2006.01)
(Continued)

(52) U.S. Cl.
CPC ............ *H04L 27/04* (2013.01); *G01S 13/756* (2013.01); *G01S 13/758* (2013.01);
(Continued)

(58) Field of Classification Search
CPC ............ G06K 7/008; G06K 19/07779; G06K 19/0726; G06K 19/07777; G06K 7/086; G06K 7/10237; G06K 7/10316; G06K 19/07749; G06K 19/0723; H01Q 7/00; H01Q 1/2208; H01Q 1/2225; H01Q 1/243; H01Q 1/2216; H04B 5/0062; H04B 5/0068; H04B 5/0075; H04B 5/0081; H04L 27/04; H04L 27/0008; H04L 27/36; H04L 27/20; H04L 27/2626; G01S 13/758; G01S 13/756; G01S 13/825; H01F 38/14
USPC .................... 340/13.26, 12.51; 375/315, 295; 343/700 R, 749, 750
See application file for complete search history.

(56) References Cited

U.S. PATENT DOCUMENTS

| 4,380,064 A | 4/1983 | Ishikawa et al. |
| 4,701,871 A | 10/1987 | Sasaki et al. |

(Continued)

FOREIGN PATENT DOCUMENTS

| EP | 2330538 | 6/2011 |
| EP | 2330538 A1 | 6/2011 |
| WO | 2014/008576 A1 | 1/2014 |

OTHER PUBLICATIONS

International Searching Authority (ISA/CA), International Search Report and Written Opinion, mailed Aug. 2, 2013, for corresponding International Patent Application No. PCT/CA2013/000456.

(Continued)

*Primary Examiner* — Vineeta Panwalkar
(74) *Attorney, Agent, or Firm* — Gowling Lafleur Henderson LLP; Joseph Conneely

(57) ABSTRACT

A transmission apparatus for a wireless device, comprising: an antenna for receiving an original signal and for backscattering a modulated signal containing information from the wireless device; a variable impedance coupled to the antenna, the variable impedance having an impedance value; a delta-sigma modulator coupled to the variable impedance for modulating the impedance value, and thereby a backscattering coefficient for the antenna, in accordance with the information to generate the modulated signal; and, a decoder coupled to the delta-sigma modulator for generating the impedance value from the information.

65 Claims, 12 Drawing Sheets

(51) Int. Cl.
*G06K 19/07* (2006.01)
*H04B 5/00* (2006.01)
*H04L 27/00* (2006.01)
*G06K 19/077* (2006.01)
*G01S 13/82* (2006.01)
*H04L 27/20* (2006.01)
*H04L 27/26* (2006.01)
*H04L 27/36* (2006.01)

(52) U.S. Cl.
CPC ..... *G06K 19/0723* (2013.01); *G06K 19/07749* (2013.01); *H04B 5/0068* (2013.01); *H04L 27/0008* (2013.01); *G01S 13/825* (2013.01); *H04L 27/20* (2013.01); *H04L 27/2626* (2013.01); *H04L 27/36* (2013.01)

(56) References Cited

U.S. PATENT DOCUMENTS

| | | | | |
|---|---|---|---|---|
| 8,590,790 | B1* | 11/2013 | Manku | 235/439 |
| 8,847,834 | B2* | 9/2014 | Manku | 343/750 |
| 2002/0008656 | A1 | 1/2002 | Landt | |
| 2004/0069852 | A1 | 4/2004 | Seppinen et al. | |
| 2005/0083179 | A1* | 4/2005 | Carrender et al. | 340/10.4 |
| 2005/0117663 | A1* | 6/2005 | Drogi et al. | 375/316 |
| 2006/0145817 | A1 | 7/2006 | Aikawa et al. | |
| 2006/0236203 | A1 | 10/2006 | Diorio et al. | |
| 2007/0290747 | A1 | 12/2007 | Traylor et al. | |
| 2008/0081571 | A1 | 4/2008 | Rofougaran | |
| 2011/0089955 | A1 | 4/2011 | Kato et al. | |
| 2011/0169523 | A1 | 7/2011 | Atrash et al. | |
| 2013/0300619 | A1 | 11/2013 | Manku | |
| 2014/0016719 | A1 | 1/2014 | Manku | |

OTHER PUBLICATIONS

Chawla, V., et al., "An Overview of Passive RFID", IEEE Communications Magazine, vol. 45, Issue 9, Sep. 2007, pp. 11 to 17.
Stewart Thomas, et al., "QAM Backscatter for Passive UHF RFID Tags", RFID, 2010 IEEE International Conference On, pp. 210-214, Apr. 14-16 2010, Orlando, Florida, USA.
Harry Stockman, "Communication by Means of Reflected Power", Proceedings of the I.R.E., pp. 1196-1204, vol. 36, 1948, Oct. 1948.
International Searching Authority (ISA/CA), International Search Report and Written Opinion, mailed Mar. 9, 2015, for corresponding International Patent Application No. PCT/CA2014/000745.
Japanese Patent Office, Office Action (with Translation), mailed Aug. 13, 2015, for corresponding Japanese Patent Application No. 2015-520781.
Stewart J. Thomas, et al., "Quadrature Amplitude Modulated Backscatter in Passive and Semipassive UHF RFID Systems", IEEE Transactions on Microwave Theory and Techniques, vol. 60, No. 4, Apr. 2012, pp. 1175-1182.

* cited by examiner

ASK/OOK Reflected power

PSK Reflected power

TRANSMISSION APPARATUS FOR A WIRELESS DEVICE USING DELTA-SIGMA MODULATION

This application is a continuation-in-part of U.S. patent application Ser. No. 13/874,996, filed May 1, 2013, and incorporated herein by reference, and claims priority from U.S. Provisional Patent Application No. 61/670,259, filed Jul. 11, 2012, and incorporated herein by reference.

FIELD OF THE INVENTION

This invention relates to the field of radio frequency identification systems, and more specifically, to transmission apparatus for wireless devices (e.g., tags) in backscattered and inductively coupled radio frequency identification systems.

BACKGROUND OF THE INVENTION

Radio frequency identification ("RFID") systems have become very popular in a great number of applications. A typical RFID system 100 is shown in FIG. 1. The RFID system 100 includes an application system 110, a reader 120, and a tag 130. When the tag 130 appears in the operational range of the reader 120, it starts receiving both energy 140 and data 150 via its antenna 133 from the reader 120 via its transmitter/receiver 121 and antenna 123. A rectify circuit 131 in the tag 130 collects and stores the energy 140 for powering the other circuits (e.g., control/modulator 132) in the tag 130. After collecting enough energy 140, the tag 130 may operate and send back pre-stored data to the reader 120. The reader 120 then passes the received response data via a communications interface 160 to the server system/database 111 of the application system 110 for system applications.

The tags 130 in RFID system 100 may be classified into passive and active types according to the power provisions of the tags. Passive tags do not have their own power supply and therefore draw all power required from the reader 120 by electromagnetic energy received via the tag's antenna 133. In contrast, active tags incorporate a battery which supplies all or part of the power required for their operation.

A typical transmission method of energy 140 and data 150 between a reader 120 and a tag 130 in a RFID system 100 is by way of backscatter coupling (or backscattering). The antenna 123 of the reader 120 couples energy 140 to the tag 130. By modulating the reflection coefficient of the tag's antenna 133, data 150 may be transmitted between the tag 130 and the reader 120. Backscattering, as shown in FIG. 2, is typically used in microwave band RFID systems. Power $P_{in}$ is emitted from the reader's antenna 123. A small proportion of $P_{in}$ is received by the tag's antenna 133 and is rectified to charge the storing capacitor in the tag 130 for serving as a power supply. After gathering enough energy, the tag 130 begins operating. A portion of the incoming power $P_{in}$ is reflected by the tag's antenna 133 and returned as power $P_{return}$. The reflection characteristics may be influenced by altering the load connected to the antenna 133. In order to transmit data 150 from the tag 130 to the reader 120, a transistor is switched on and off in time with the transmitted data stream. The magnitude of the reflected power $P_{return}$ may thus be modulated and picked up by the reader's antenna 123.

Amplitude shift keying ("ASK") modulation is typically used in RFID systems 100. In ASK modulation, the amplitude of the carrier is switched between two states controlled by the binary transmitting code sequence. Also, in some applications, phase shift keying ("PSK") modulation is also used. However, arbitrary complex type modulations are generally not used in current RFID backscattering systems. Here complex type modulations are ones that are normally expressed as I+jQ, where I is the in-phase component, Q is the quadrature component, and j is the square root of −1.

For reference, the beginnings of RFID use may be found as far back as World War II. See for example, Stockman H., "Communication By Means of Reflected Power," Proc. IRE, pp. 1196-1204, October 1948. Passive and semi-passive RFID tags were used to communicate with the reader by radio frequency ("RF") backscattering. In backscattering RFID systems, a number of tags 130 interact with a main reader device 120 as shown in FIG. 3. The reader 130 is used to: (i) power up the tags 130 via the power of the RF signal; (ii) transfer data to the tags 130; and, (iii) read information from the tags 130.

Typically, a link budget exists between the reader 120 and the tag 130. The tag 130 communicates with the reader 120 by backscattering the RF signal back to the reader 120 using either ASK or PSK modulation. One advantage of the backscattering method is that it does not need to generate an RF carrier on chip within the tag 130, thus it requires less power, less complexity, and less cost. A typical block diagram of a backscattering transmission apparatus 400 for a tag 130 is shown in FIG. 4. In FIG. 4, $Z_{ant}$ is the impedance of the antenna 133 and $Z_o$ is a fixed impedance which is in parallel with a switch 410. The reflection coefficient Γ is given by the equation:

$$\Gamma = \frac{Z_o - Z_{ant}}{Z_o + Z_{ant}}$$

With the switch 410 on (i.e., closed), Γ=1. When the switch is off (i.e., open), Γ=0. By turning the switch 410 on and off, an ASK signal 420 is generated as shown in FIG. 4.

PSK signals may also be generated using a similar set up. This is shown in the transmission apparatus 500 illustrated in FIG. 5. Here, the reflection coefficient Γ is given by the equation:

$$\Gamma = \frac{(Z_i + Z_o) - Z_{ant}}{(Z_i + Z_o) + Z_{ant}}$$

Here, $Z_i$ is an impedance that is switched in as per FIG. 5. So, depending on the position of the switch 410, 510, backscattering is designed to produce either an ASK signal 420 or a PSK signal 520.

As shown in FIG. 6, using backscattering techniques, each tag 130 sends RF signals 610 on the same carrier 620 and hence overlapping the RF spectrum of other tags 130. This poses a challenge which respect to avoiding data collisions between all of the tags 130. In current systems, these collision issues are solved via the communication protocol used between the reader 120 and the tags 130.

In Thomas S., Reynolds S. Matthew, "QAM Backscatter for Passive UHF RFID Tags", IEEE RFID, p. 210, 2010 (Thomas et al.), the generation of four quadrature amplitude modulation ("QAM") signals was proposed in which a number of Γ values are switched in and out.

There are several problems with prior tag transmission apparatus. For example, systems such as that proposed by Thomas et al. are limited in the nature of signals that they can backscatter. That is, any arbitrary signal cannot be transmitted. For example, if the QAM signal is first filtered via a filter, Thomas et al.'s system cannot transmit a filtered version of the QAM signal. As another example, if the signal is simply a sine wave or a Gaussian minimum shift keying ("GMSK") signal, Thomas et al.'s system cannot be used to transmit this signal. As a further example, Thomas et, al.'s system cannot transmit single side band signals.

A need therefore exists for an improved transmission apparatus for wireless devices (e.g., tags) in backscattered and inductively coupled radio frequency identification systems. Accordingly, a solution that addresses, at least in part, the above and other shortcomings is desired.

SUMMARY OF THE INVENTION

According to one aspect of the invention, there is provided a transmission apparatus for a wireless device, comprising: an antenna for receiving an original signal and for backscattering a modulated signal containing information from the wireless device; a variable impedance coupled to the antenna, the variable impedance having an impedance value; a delta-sigma modulator coupled to the variable impedance for modulating the impedance value, and thereby a backscattering coefficient for the antenna, in accordance with the information to generate the modulated signal; and, a decoder coupled to the delta-sigma modulator for generating the impedance value from the information.

BRIEF DESCRIPTION OF THE DRAWINGS

Features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE EMBODIMENTS

In the following description, details are set forth to provide an understanding of the invention. In some instances, certain software, circuits, structures and methods have not been described or shown in detail in order not to obscure the invention. The term "apparatus" is used herein to refer to any machine for processing data, including the systems, devices, and network arrangements described herein. The term "wireless device" is used herein to refer to RFID tags, RFID transponders, cellular telephones, smart phones, portable computers, notebook computers, or similar devices. The present invention may be implemented in any computer programming language provided that the operating system of the data processing system provides the facilities that may support the requirements of the present invention. Any limitations presented would be a result of a particular type of operating system or computer programming language and would not be a limitation of the present invention. The present invention may also be implemented in hardware or in a combination of hardware and software.

Figure 1:
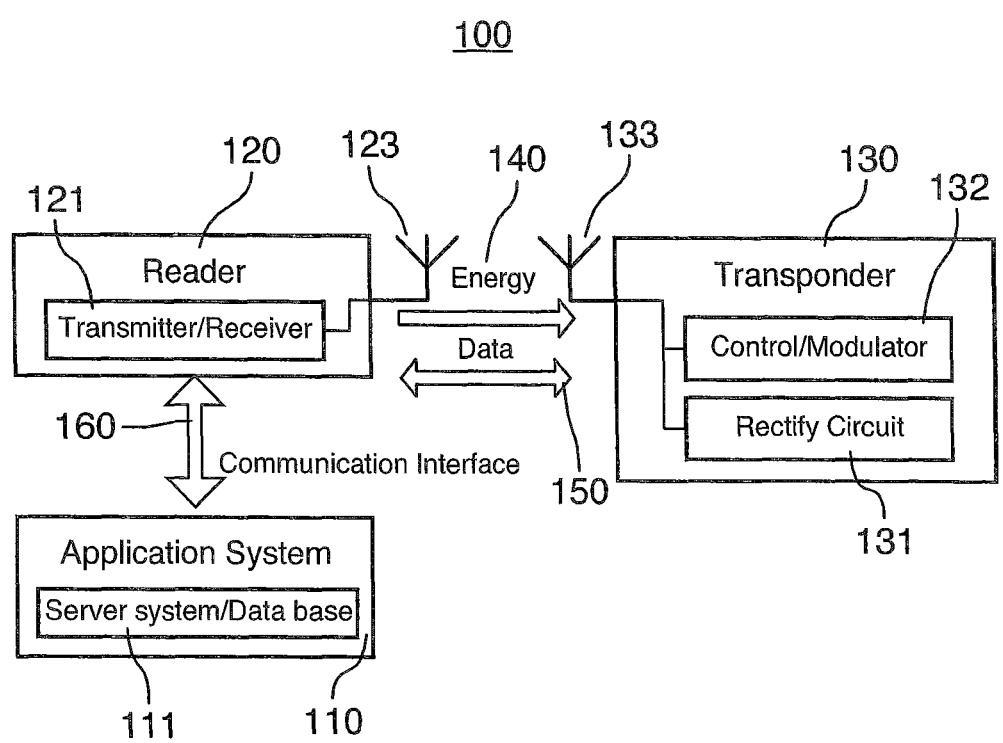
FIG. 1 is a block diagram illustrating a radio frequency identification (RFID) system in accordance with the prior art.
Figure 2:
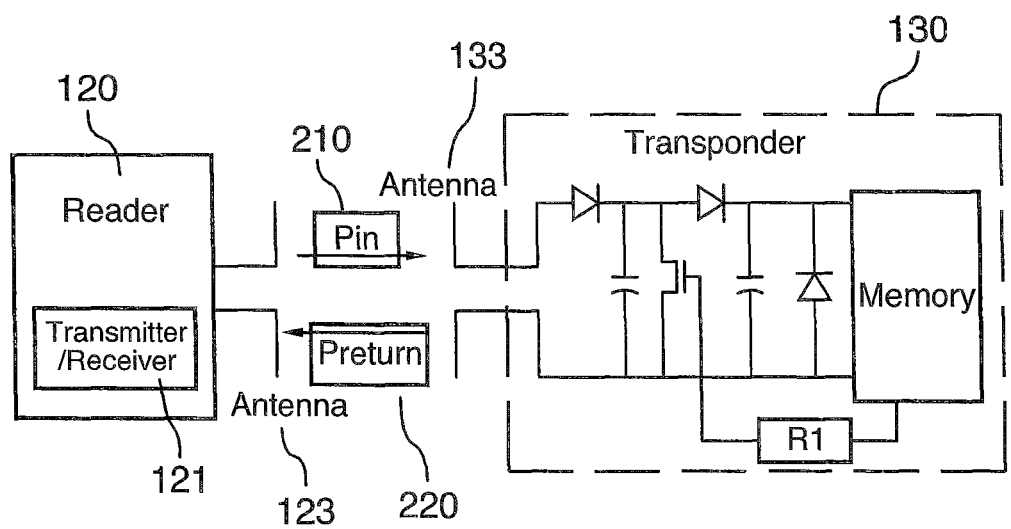
FIG. 2 is a block diagram illustrating transmission of energy and data between a reader and a tag in a RFID system in accordance with the prior art.
Figure 3:
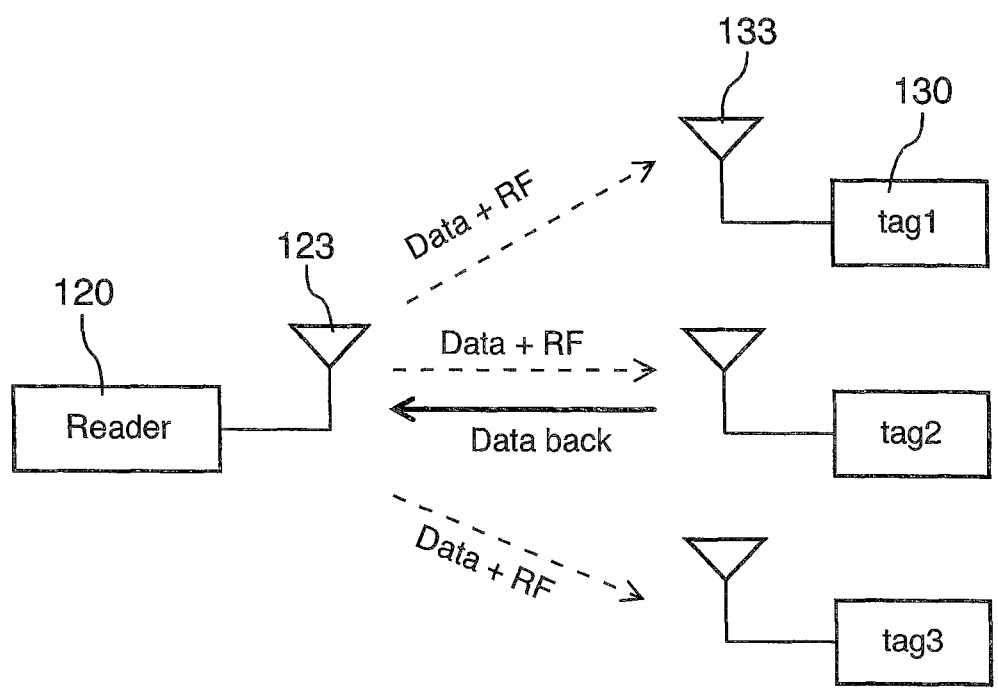
FIG. 3 is a block diagram illustrating communications between a reader and multiple tags in an RFID system in accordance with the prior art.
Figure 4:
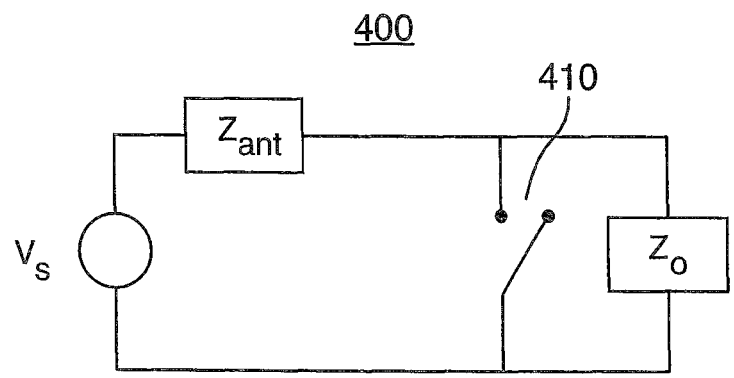
FIG. 4 is a block diagram illustrating a transmission apparatus for a tag for backscattering ASK and/or on-off keying ("OOK") signals in accordance with the prior art.
Figure 4:
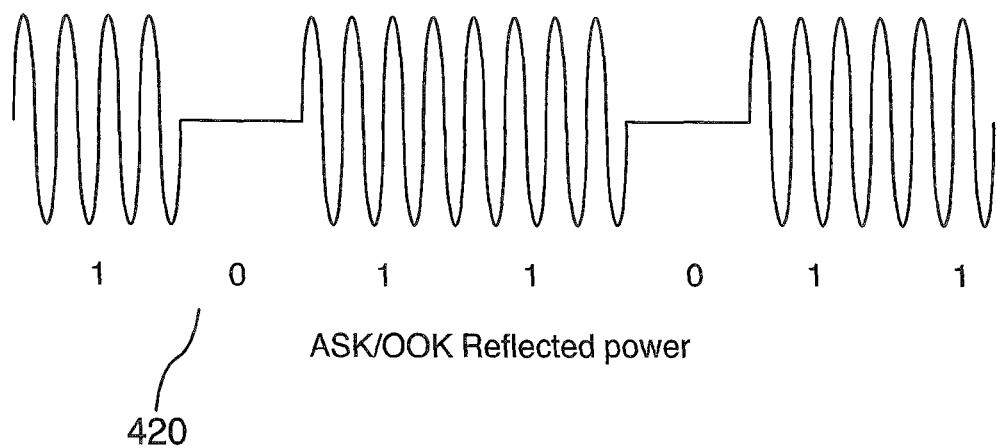
Figure 5:
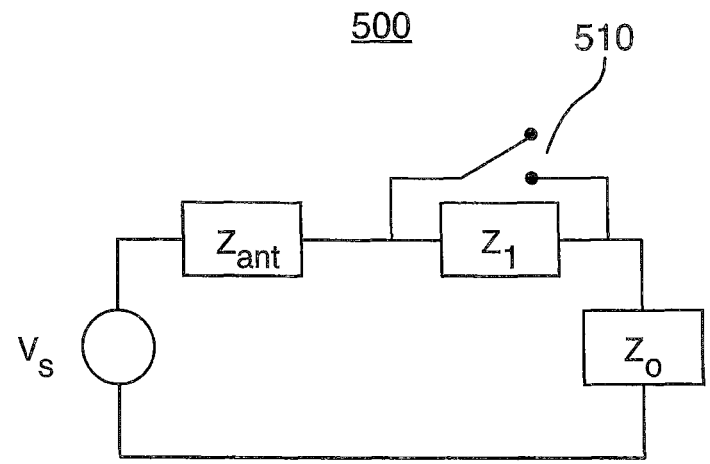
FIG. 5 is a block diagram illustrating a transmission apparatus for a tag for backscattering PSK signals in accordance with the prior art.
Figure 5:
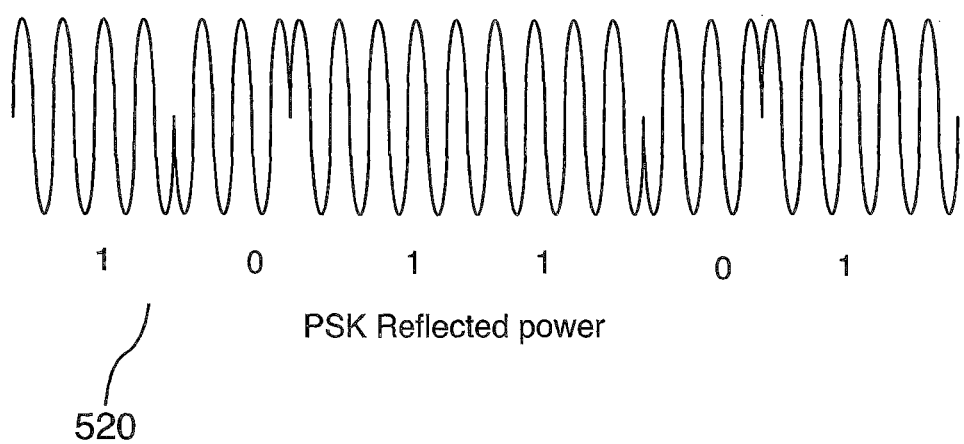
Figure 6:
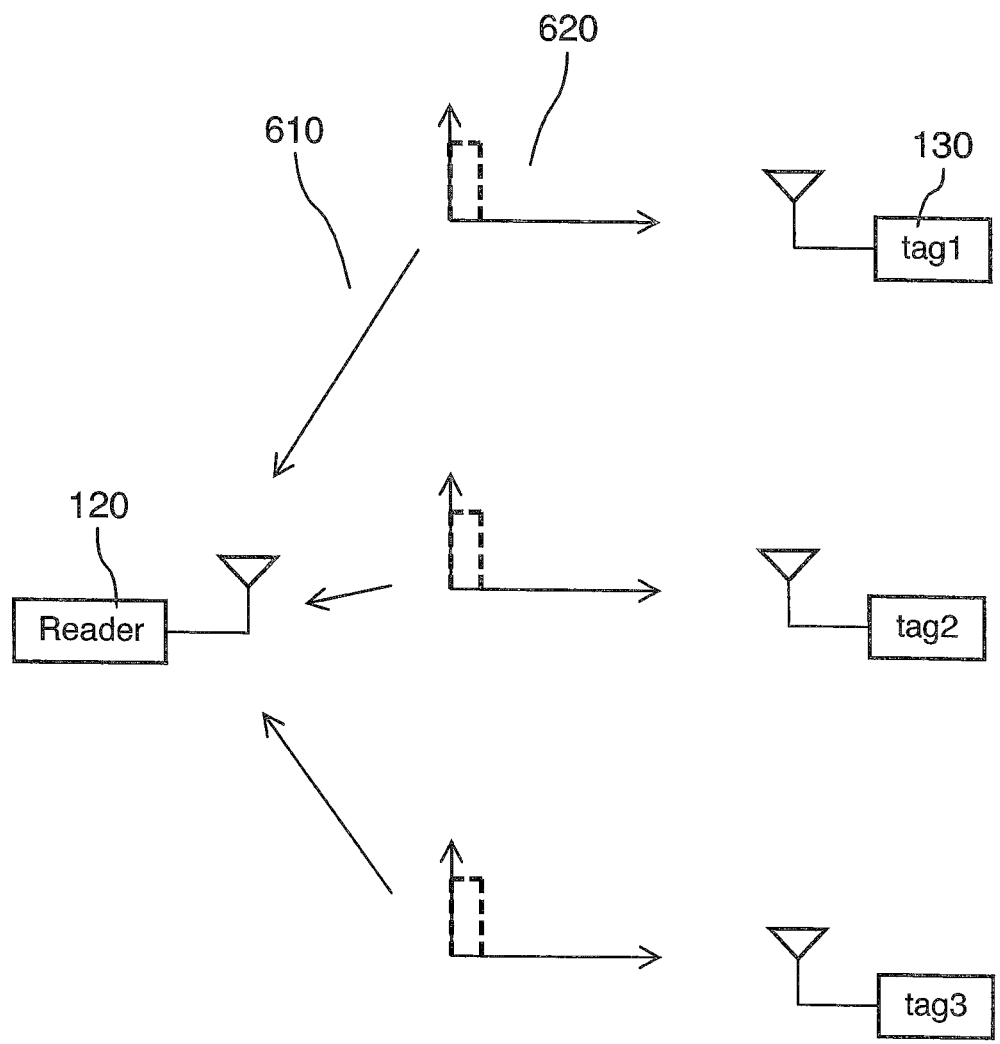
FIG. 6 is a block diagram illustrating multiple tags communicating back to a reader using the same frequency spectrum in accordance with the prior art.
Figure 7A:
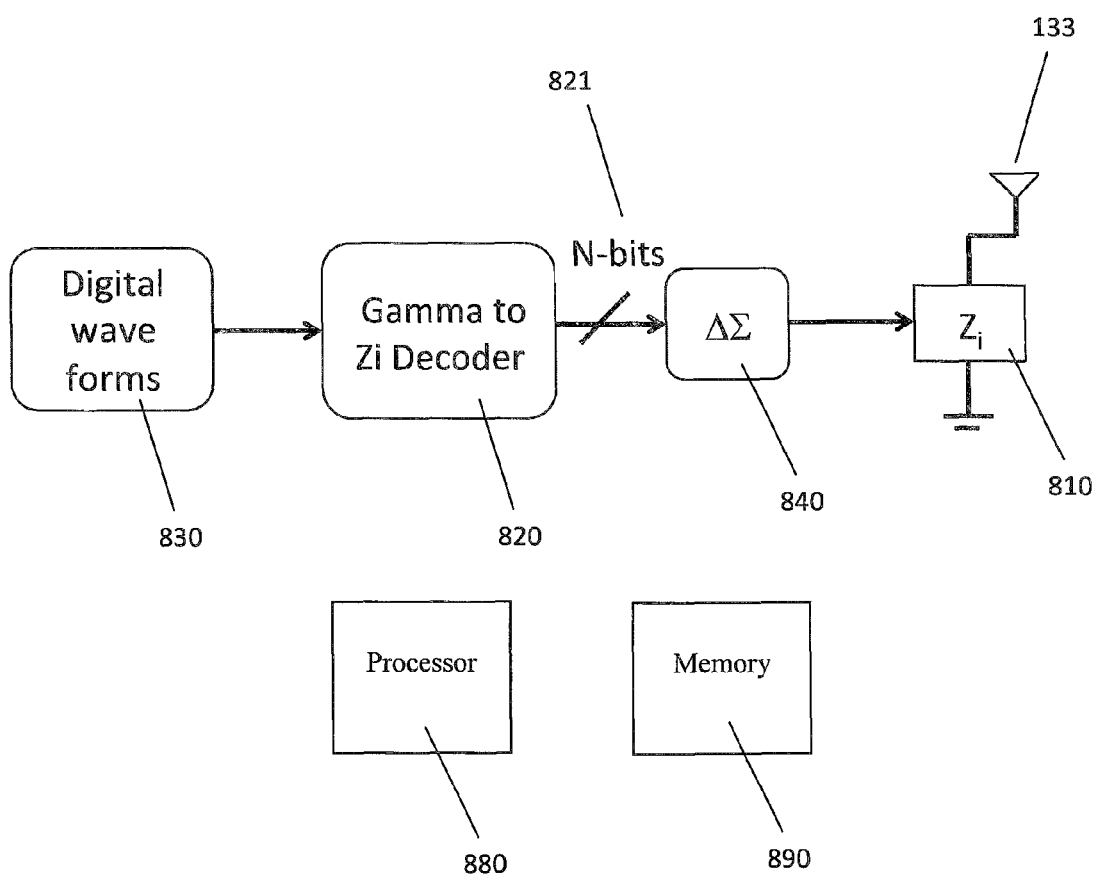
FIG. 7A is a block diagram illustrating a transmission apparatus for a wireless device for backscattering signals to a reader based on a digital wave form input in accordance with an embodiment of the invention.
Figure 7B:
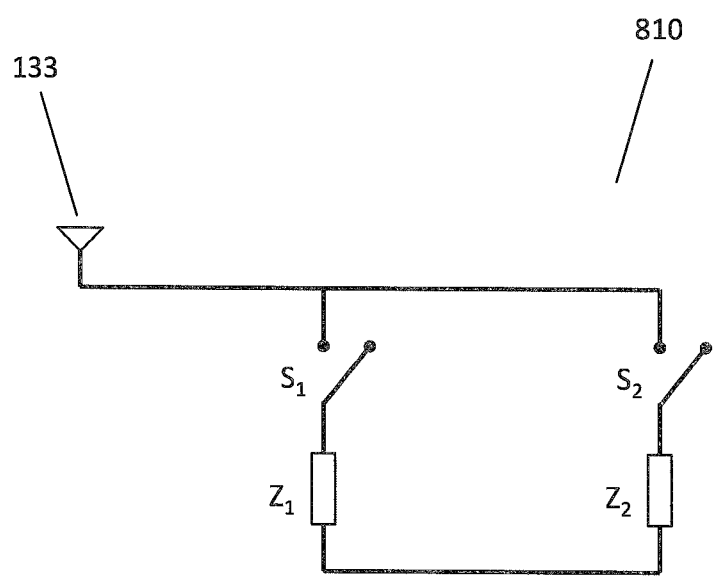
FIG. 7B is a block diagram illustrating a variable impedance circuit for the transmission apparatus of FIG. 7A in accordance with an embodiment of the invention.

FIG. 7A is a block diagram illustrating a transmission apparatus 800 for a wireless device 130 for backscattering signals to a reader 120 based on a digital wave form input 830 in accordance with an embodiment of the invention. And, FIG. 7B is a block diagram illustrating a variable impedance 810 circuit for the transmission apparatus 800 of FIG. 7A in accordance with an embodiment of the invention. The present invention provides a method and apparatus for generating complex waveforms for passive and semi-passive RFID systems 100. The complex wave forms may generate any type of complex modulation signals such as 8-constellation phase shift keying ("8PSK"), orthogonal frequency-division multiplexing ("OFDM"), or n-constellation quadrature amplitude modulation ("nQAM"). The method and apparatus may also be used to generate frequency channels for each wireless device 130. According to one embodiment, the transmission apparatus (e.g., 800) includes an antenna 133 coupled to a variable impedance 810 having an array of impedances (e.g., the first impedance $Z_1$ and the second impedance $Z_2$ in FIG. 7B) that are switched on or off (via the first switch $S_1$ and the second switch $S_2$ in FIG. 7B, respectively) via a backscattering decoder 820 and a delta-sigma ($\Delta\Sigma$) modulator 840 in the wireless device 130. The signal 830 applied to the input of the decoder 820 may consist of any type of digital signal. The transmission apparatus 800 may include a processor 880 for controlling the decoder 820, delta-sigma ($\Delta\Sigma$) modulator 840, and variable impedance 810, memory 890 for storing information (e.g., digital waveforms 830), and related hardware and software as is known to one of skill in the art.

Figure 8:
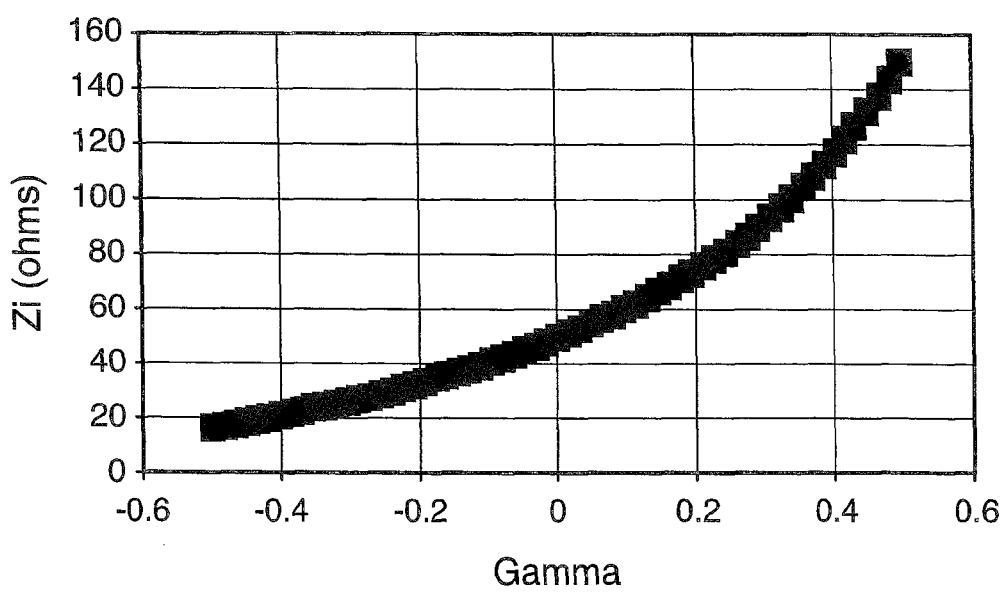
FIG. 8 is a graph illustrating the relationship between Gamma ($\Gamma$) and $Z_i$ in accordance with an embodiment of the invention.

FIG. 8 is a graph illustrating the relationship between Gamma ($\Gamma$) and $Z_i$ in accordance with an embodiment of the invention. Here, $\Gamma$ is the reflection coefficient and $Z_i$ is the impedance seen by the antenna 133. The reflection coefficient is directly proportional to the digital wave form 830. According to one embodiment of the invention, for backscattering RF applications, the reflection or backscattering coefficient Gamma ($\Gamma$) is given by:

$$\Gamma_i = \alpha e^{j\phi_i}$$

where $\phi_i$ is the phase, $\alpha$ is the magnitude of the reflection coefficient, and j is the square root of −1. The back scattering impedance (i.e., the impedance seen by the antenna 133) is then given by:

$$Z_i = \frac{Z_s(1 + \alpha e^{j\phi_i})}{(1 - \alpha e^{j\phi_i})}$$

where $Z_s$ is a constant (typically 50 ohms) and $Z_i$ is the back scattering impedance value.

Assuming the phase is zero:

$$Z_i = \frac{Z_s(1 + \alpha)}{(1 - \alpha)}$$

If s(t) is a signal (e.g., a sine wave) that is to be sent to the reader 120, it must be directly related to $\alpha(t)$ (e.g., s(t) is directly proportional to $\alpha(t)$) and thus $\Gamma$. This produces an impedance value $Z_i$ that varies with time.

In this embodiment, the signal s(t) would be backscattered back to the reader 120 by the wireless device 130. In the transmission apparatus 800 shown in FIG. 7A, N-bits 821 are applied to the variable impedance 810 via the delta-sigma ($\Delta\Sigma$) modulator 840 such that the impedance value $Z_i$ is encoded as shown in FIG. 8. Here, the variable impedance 810 has N states. If there are any errors in the encoding or imperfections in encoding of $Z_i$, these may be corrected within the reader 120. This is possible if for some time the signal s(t) is known by the reader 120. The reader 120 than may add distortion to the incoming signal to correct for these imperfections.

Referring again to FIGS. 7A and 7B, the digital wave form information 830 (e.g., N-bit information) is applied to an element such as a decoder 820 that converts a scatter value or reflection coefficient $\Gamma$ for the information 830 into an impedance value $Z_i$. This impedance value $Z_i$ (e.g., N-bits 821) is then applied to a delta-sigma ($\Delta\Sigma$) modulator 840 which controls the switches $S_1$, $S_2$ in the variable impedance 810 to switch between respective impedances $Z_1$, $Z_2$ based on the output of the delta-sigma ($\Delta\Sigma$) modulator 840. For example, if the output of the delta-sigma ($\Delta\Sigma$) modulator 840 is "1", the impedance value $Z_i$ is set to the value of the second impedance $Z_2$. If the output of the delta-sigma ($\Delta\Sigma$) modulator 840 is "0", the impedance value $Z_i$ is set to the value of the first impedance $Z_1$. For example, impedance values of 116 ohms for the second impedance $Z_2$ and 21 ohms for the first impedance $Z_1$ may correspond to reflection coefficients $\Gamma$ of 0.4 and −0.4, respectively. If the desired reflection coefficient $\Gamma$ is zero, the decoder 820 may determine an impedance value $Z_i$ of 50 ohms (as per the graph shown in FIG. 8). The delta-sigma ($\Delta\Sigma$) modulator 840 now generates an output that produces an average impedance value for the variable impedance 810 of 50 ohms by switching between the 21 and 116 ohms impedances $Z_2$, $Z_1$.

As shown in FIG. 7B, the variable impedance 810 circuit may be made up of an array of impedances $Z_1$, $Z_2$ that are switched in and out by respective switches $S_1$, $S_2$ depending on the digital decoder 820 and delta-sigma ($\Delta\Sigma$) modulator 840. Also, the variable impedance 810 may be controlled via an analog signal, that is, after the Gamma to $Z_i$ decoder 820 and delta-sigma ($\Delta\Sigma$) modulator 840, a digital to analog converter ("DAC") (not shown) may be added to drive the variable impedance 810.

The delta-sigma ($\Delta\Sigma$) modulator 840 may be of variable design. For example, according to one embodiment, the delta-sigma ($\Delta\Sigma$) modulator 840 may include or be a low-pass delta-sigma ($\Delta\Sigma$) modulator. According to another embodiment, the delta-sigma ($\Delta\Sigma$) modulator 840 may include or be a band-pass delta-sigma ($\Delta\Sigma$) modulator. According to one embodiment, the the delta-sigma ($\Delta\Sigma$) modulator 840 may be a single bit delta-sigma ($\Delta\Sigma$) modulator.

The delta-sigma ($\Delta\Sigma$) modulator 840 generates an output bit stream that represents the input data 821 from a DC level to some predetermined design bandwidth. Beyond the predetermined design bandwidth, quantized noise of the delta-sigma ($\Delta\Sigma$) modulator 840 may increase until, at some design cutoff point, the signal may be deemed to have too much quantization noise. According to one embodiment, one or more filters may be included in the variable impedance 810 circuit to filter out-of-band noise output from the delta-sigma ($\Delta\Sigma$) modulator 840. The variable impedance 810 circuit has an output electrically connected to the antenna 133. The delta-sigma ($\Delta\Sigma$) modulator 840 is coupled to an input to the variable impedance 810 circuit to digitally control the output of the variable impedance 810 circuit such that the reflection coefficient $\Gamma$ of the antenna 133 may be adjusted by changing the impedance value $Z_i$ of the variable impedance 810 circuit. According to one embodiment, the output of the delta-sigma ($\Delta\Sigma$) modulator 840 switches the impedance value $Z_i$ of the variable impedance 810 between at least two states or impedance values $Z_i$.

According to one embodiment, the delta-sigma ($\Delta\Sigma$) modulator 840 may be of any order based on the bandwidth of the signals being applied to it. In addition, the clock applied to the delta-sigma ($\Delta\Sigma$) modulator 840 may set the over-sampling rate.

Figure 9:
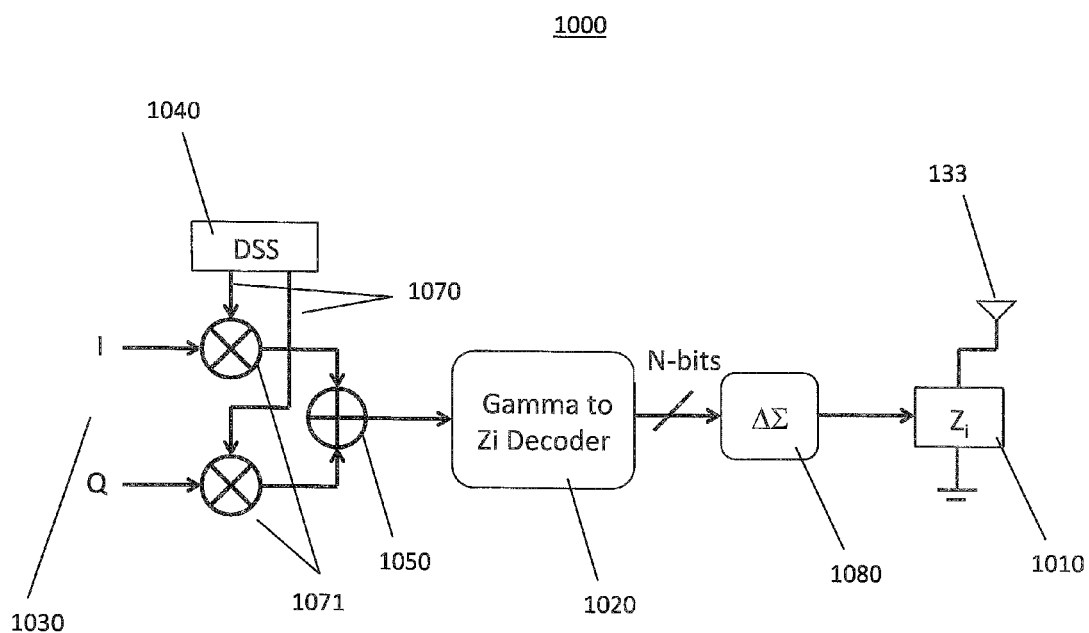
FIG. 9 is a block diagram illustrating a transmission apparatus with an adder for a wireless device for backscattering arbitrary modulated signals to a reader based on I and Q data input in accordance with an embodiment of the invention.

FIG. 9 is a block diagram illustrating a transmission apparatus 1000 with an adder 1050 for a wireless device 130 for backscattering arbitrary modulated signals to a reader 120 based on I and Q data input 1030 in accordance with an embodiment of the invention. According to one embodiment, the digital waveform 830 may be in-phase ("I") and quadrature ("Q") data 1030 as shown in FIG. 9. In FIG. 9, a digital signal generator ("DSS") 1040 may optionally up-convert (or offset) the I and Q data 1030. For example, the DSS 1040 may provide sine (or cosine) and cosine (or sine) signals 1070 that are applied to I and Q data by respective mixers 1071. Alternatively, the DSS 1040 may generate a constant value that is multiplied onto the I and Q data (i.e., the mixers 1071 act as gain elements). The Gamma to $Z_i$ decoder 1020 receives the up-converted (or offset) I and Q data and applies it to the variable impedance 1010 via the delta-sigma ($\Delta\Sigma$) modulator 1080. The variable impedance 1010 may be made up of an array of impedances that are switched in or out (e.g., a parallel array of impedances with respective switches).

Summarizing the above, and referring again to FIGS. 7A and 7B, according to one embodiment an antenna 133 is used to backscatter an incoming radio frequency signal coming from a reader 120. The antenna 133 is electrically coupled to an array of impedance devices $Z_1$, $Z_2$ connected to switches $S_1$, $S_2$. The array of impedance devices (e.g., variable impedance 810) may be digitally controlled by a digital block (e.g., decoder 820) and a delta-sigma ($\Delta\Sigma$) modulator 840 that are driven by an arbitrary N-bit digital waveform (e.g., 830). The digital block 820 presents an output to the array of impedances 810 via the delta-sigma ($\Delta\Sigma$) modulator 840 that is related to the N-bit digital waveform 830. A change in the impedance value of the array of impedances 810 backscatters the incoming radio frequency signal thus producing a direct up-converted version of the output of the digital waveform 830 with respect to the incoming radio frequency. The output of the digital block 820 and delta-sigma (ΔΣ) modulator 840 switches the array of impedances 810 between various states, which changes the characteristics of the reflection coefficient Γ. The signal 830 applied to the digital block 820 may take the form of any complex modulation signal, for example, GMSK, nPSK, 8PSK, nQAM, OFDM, etc., and such signals may be offset from the incoming radio frequency signal by a frequency +/−ω.

Referring again to FIG. 9, the input 1030 to the digital block 1020 may alternate between in-phase (i.e., I) and quadrature (i.e., Q) signals via a control signal, for example. Also, the array of impedances 1010 may switch between backscattering coefficients that are 90 degrees offset from each other depending on whether the data is I or Q data. For example, if the I signals would produce backscattering coefficients at theta degrees then the Q signals would produce backscattering coefficients that are theta+90 degrees. The control signal may be a clock signal. The signals 1070 applied to the I and Q signals 1030 by the DSS 1040 may take the form of a direct current ("DC") signal (i.e., no frequency offset) or of sine and cosine waves at a selected frequency (i.e., to give a frequency offset of ω). The I and Q signals applied to the digital block 1020 may be adjusted to compensate for any errors in the impedance array 1010, the delta-sigma (ΔΣ) modulator 1080, or the digital block 1020. The array of impedances 1010 may include some filtering characteristics to filter off some of the digital block's 1020 or delta-sigma (ΔΣ) modulator's 1080 out-of-band noise. And, the reader 120 used to detect the backscattered signal from the wireless device 130 may compensate for any errors generated within the impedance array 1010, the digital block 1020, or the delta-sigma (ΔΣ) modulator 1080.

Figure 10A:
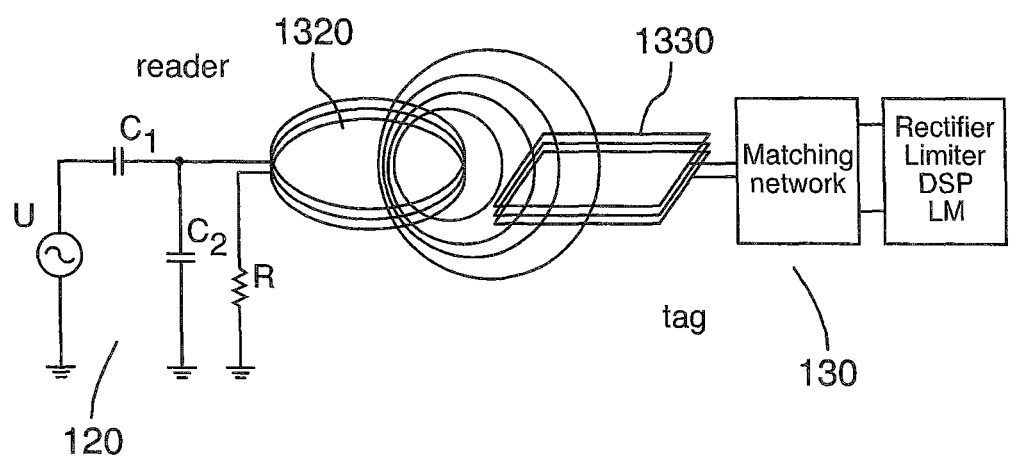
FIG. 10A is a block diagram illustrating inductive coupling between a reader and a wireless device in a RFID system in accordance with an embodiment of the invention.
Figure 10B:
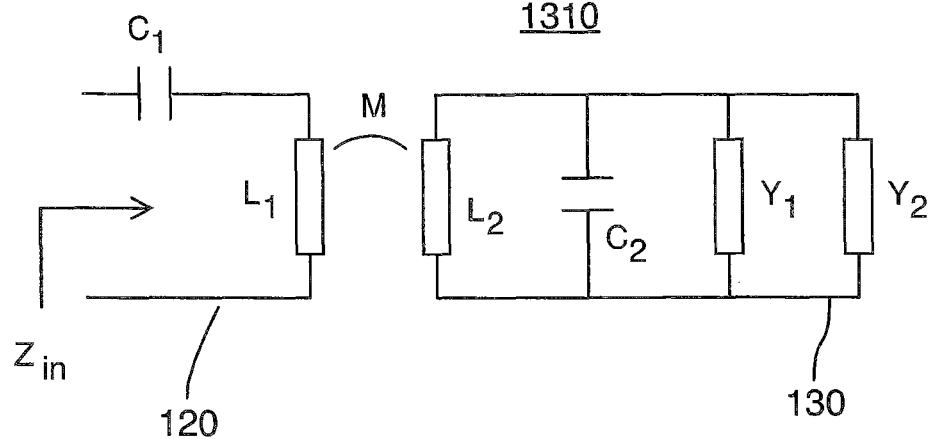
FIG. 10B is a block diagram illustrating an equivalent circuit for the RFID system of FIG. 10A in accordance with an embodiment of the invention; and, FIG. 11 is a block diagram illustrating a transmission apparatus using inductive coupling for a wireless device for transmitting signals to a reader based on a digital waveform input in accordance with an embodiment of the invention.
Figure 11:
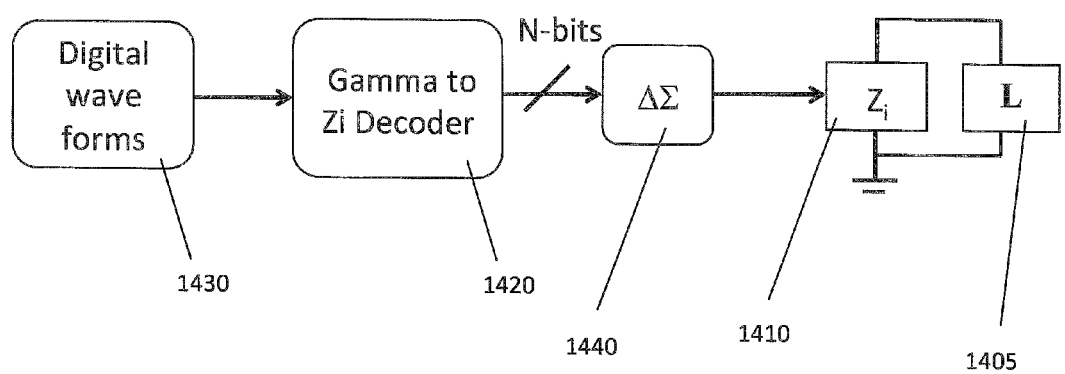

FIG. 10A is a block diagram illustrating inductive coupling between a reader 120 and a wireless device 130 in a RFID system 1300 in accordance with an embodiment of the invention. FIG. 10B is a block diagram illustrating an equivalent circuit 1310 for the RFID system 1300 of FIG. 10A in accordance with an embodiment of the invention. And, FIG. 11 is a block diagram illustrating a transmission apparatus 1400 using inductive coupling for a wireless device 130 for transmitting signals to a reader 120 based on a digital waveform input 1430 in accordance with an embodiment of the invention.

According to one embodiment, communication between the reader 120 and the wireless device 130 may occur by sensing inductive loading changes in the reader 120. Here, the reader 120 communicates with the wireless device 120 via magnetic or inductive coupling. This is shown in FIGS. 10A and 10B. FIGS. 10A and 10B show the basic principle of an inductive coupled RFID system 1300. For inductive coupled systems 1300, the underlying coils are defined by their size. It is known that a coupling system of two coils 1320, 1330 may be represented by an equivalent transformer. The connection between these two coils 1320, 1330 is given by the magnetic field (B) and the underlying value to describe this connection is the mutual inductance (M) and/or the coupling factor (k).

The law of Biot and Savart is given by:

$$\vec{B} = \frac{\mu_o i_1}{4\pi} \oint_S \frac{\vec{ds} \times \vec{x}}{|\vec{x}|^3}$$

This allows the calculation of the magnetic field at every point as a function of the current, $i_1$, as well as the geometry. Here, $\mu_o$ is the permeability, x is the distance, and S describes the integration-path along the coil. Furthermore, the mutual inductance and the coupling factor are given by:

$$M = \int_{A_2} \frac{B(i_1)}{i_1} dA_2$$

$$k = \frac{M}{\sqrt{L_1 L_2}}$$

In these equations, $A_2$ describes the area of the second coil and $L_1$ and $L_2$ are the inductances of the two coils 1320, 1330. The distance x between the reader-coil 1320 and transponder-coil 1330 also determines the coupling factor. The equivalent model for this coupling is shown in FIG. 10B. The impedance value $Z_i$ as seen by the reader 120 is directly related to the admittances Y1 and Y2. The admittances Y1 and Y2 are either modulated via amplitude (e.g., ASK) or in phase (e.g., PSK). The admittances Y1 and Y2 may also be modulated using multi-phase PSK and multi-amplitude ASK.

General speaking, the signal received back by the reader 120 is a function of the impedance value changing in the wireless device 130. Once this impedance value changes, the signal seen by the reader 120 is modified and the reader 120 can detect this.

As in the case of backscattering, as shown in FIG. 11, a variable impedance 1410 may be modified by a decoder 1420 via a delta-sigma (ΔΣ) modulator 1440. Here, L 1405 is the inductance on the wireless device side. As in the case of backscattering, the same methods described above may be used, for example, for: (i) generating I and Q signals; (ii) general mapping from decoding to what the reader sees; and, (iii) if a signal is known by the reader, pre-distorting the signal to produce a corrected signal.

Summarizing the above, and referring again to FIG. 11, according to one embodiment there is provided a transmission apparatus 1400 for modifying an incoming radio frequency (RF) signal comprising: an inductive element 1405; an array of impedances 1410 controlled by switches and circuits having an output electrically coupled to the inductive element 1405; and, at least one digital block 1420 coupled to the array of impedances 1410 via a delta-sigma (ΔΣ) modulator 1440 for digitally controlling the impedance value $Z_i$ of the array of impedances 1410; wherein the incoming RF signal is modified as the coupled array of impedances 1410 of the inductive element 1405 is adjusted.

The output of the decoder 1420 and delta-sigma (ΔΣ) modulator 1440 may switch the array of impedances 1410 between various states which modifies the incoming RF signal. The signal 1430 applied to the digital block 1420 may take the form of any complex modulation signal, for example, GMSK, nPSK, 8PSK, nQAM, OFDM, etc., and such signals may be offset from the incoming radio frequency signal by a frequency +/−ω.

The input 1430 to the digital block 1420 may alternate between the in-phase (i.e., I) and quadrature (i.e., Q) signals via a control signal, for example. Also, the array of impedances 1410 may modify the incoming RF signal from 0 to 90 degrees offset depending on whether the data is I or Q data. For example, if the I signal would produce an impedance value at theta degrees then the Q signal would produce an impedance value that is theta+90 degrees. The control signal may be a clock signal. The signals (e.g., 1070) applied to the I and Q signals may take the form of a DC signal or of sine and cosine waves at a selected frequency. The I and Q signals applied to the digital block 1420 may be adjusted to compensate for any errors in the impedance array 1410 due to variations in the impedance value in the array. The array of impedances 1410 may have some filtering characteristics to filter off some of the DAC quantized out-of-band noise. And, the reader 120 used to detect the modulated signal may compensate for any errors generated within the impedance array 1410, the digital block 1420, or the delta-sigma ($\Delta\Sigma$) modulator 1440.

Thus, according to one embodiment, there is provided a transmission apparatus 800 for a wireless device 130, comprising: an antenna 133 for receiving an original signal and for backscattering a modulated signal containing information 830 from the wireless device 120; a variable impedance 810 coupled to the antenna 133, the variable impedance 810 having an impedance value $Z_i$; a delta-sigma ($\Delta\Sigma$) modulator 840 coupled to the variable impedance 810 for modulating the impedance value $Z_i$, and thereby a backscattering coefficient $\Gamma$ for the antenna 133, in accordance with the information 830 to generate the modulated signal (e.g., an arbitrary modulated signal); and, a decoder 820 coupled to the delta-sigma modulator 840 for generating the impedance value $Z_i$ from the information 830.

In the above transmission apparatus 800, the variable impedance 810 may be coupled in series with the antenna 133. The wireless device 130 may be powered by energy 140 from the original signal. The variable impedance 810 may include an array of impedances and respective switches. The decoder 820 may include a backscattering coefficient $\Gamma$ to impedance value $Z_i$ decoder. The information 830 may be an N-bit digital waveform 830. The N-bit digital waveform 830 may be applied to the decoder 820 and then to a delta-sigma ($\Delta\Sigma$) modulator 840 to produce a control signal 821 for the variable impedance 810 that is related to the N-bit digital waveform 830. A change in the impedance value $Z_i$ may backscatter the original signal to produce the modulated signal, the modulated signal being a frequency offset (e.g., upconverted) form of the N-bit digital waveform 830. The control signal 821 for the variable impedance 810 may switch an array of impedances within the variable impedance 810 which may change characteristics of the backscattering coefficient $\Gamma$ of the antenna 133. The information 830 may be a complex modulation signal 1030. The complex modulation signal 1030 may be offset in frequency from the original signal. The complex modulation signal 1030 may be one of a GMSK signal, a nPSK signal, a 8PSK signal, a nQAM signal, and an OFDM signal. The complex modulation signal 1030 may be represented by I+jQ, where I is an inphase component, Q is a quadrature component, and j is a square root of −1. The complex modulation signal 1030 may alternate between an in-phase signal (I) and a quadrature signal (Q) via a control signal. The variable impedance 810, 1010 may switch between backscattering coefficients that are 90 degrees offset from each other depending on whether the complex modulation signal 1030 is the in-phase signal (I) or the quadrature signal (Q). The control signal may be a clock signal. The transmission apparatus 800, 1000 may further include a digital signal generator 1040. The digital signal generator 1040 may apply a constant value signal to the in-phase signal (I) and the quadrature signal (Q). The digital signal generator 1040 may apply sine and cosine wave signals 1070 to the in-phase signal (I) and the quadrature signal (Q), respectively. The complex modulation signal 1030 may be a sum of an in-phase signal (I) and a quadrature signal (Q). The transmission apparatus 800, 1000 may further include a digital signal generator 1040. The digital signal generator 1040 may apply a constant value signal to the in-phase signal (I) and the quadrature signal (Q). The digital signal generator 1040 may apply sine and cosine wave signals 1070 to the in-phase signal (I) and the quadrature signal (Q), respectively. The N-bit digital waveform 830 may be adjusted to compensate for errors in at least one of the decoder 820, the delta-sigma ($\Delta\Sigma$) modulator 840, and the variable impedance 810. The variable impedance 810 may include a filter for filtering noise generated by at least one of the decoder 820 and the delta-sigma ($\Delta\Sigma$) modulator 840. The modulated signal may be an arbitrary signal. The wireless device 120 may be a RFID tag. The original signal may be received from a RFID reader 120. The RFID reader 120 may be configured to correct for errors in at least one of the decoder 820, the delta-sigma ($\Delta\Sigma$) modulator 840, and the variable impedance 810. The transmission apparatus 800 may further include a processor for controlling the transmission apparatus 800 and memory for storing the information 830. The delta-sigma ($\Delta\Sigma$) modulator 840 may be one of a low-pass delta-sigma modulator and a band-pass delta-sigma modulator. The delta-sigma ($\Delta\Sigma$) modulator 840 may be a single bit delta-sigma modulator. And, the delta-sigma ($\Delta\Sigma$) modulator 840 may switch ($S_1$, $S_2$) the impedance value $Z_i$ between at least two states ($Z_1$, $Z_2$).

The above embodiments may contribute to an improved method and apparatus for communications between wireless device 130 and reader 120 in backscattered and inductively coupled radio frequency identification systems and may provide one or more advantages. For example, the wireless devices 130 of the present invention are not limited in the nature of signals that they may backscatter or inductively couple to the reader 120. In addition, the wireless devices 130 of the present invention allow for filtering of these signals. In addition, the delta-sigma ($\Delta\Sigma$) modulator 840 reduces the number of impedances that need to switch states in order to produce a signal. Furthermore, the delta-sigma ($\Delta\Sigma$) modulator 840 enables high levels of modulation with as few as only one impedance.

The embodiments of the invention described above are intended to be exemplary only. Those skilled in this art will understand that various modifications of detail may be made to these embodiments, all of which come within the scope of the invention.

What is claimed is:

1. A transmission apparatus for a wireless device, comprising:
   an antenna for receiving an original signal and for backscattering a modulated signal containing information from the wireless device;
   a variable impedance coupled to the antenna, the variable impedance having an impedance value;
   a delta-sigma modulator coupled to the variable impedance for modulating the impedance value, and thereby a backscattering coefficient for the antenna, in accordance with the information to generate the modulated signal; and,
   a decoder coupled to the delta-sigma modulator for generating the impedance value from the information.

2. The transmission apparatus of claim 1 wherein the variable impedance is coupled in series with the antenna.

3. The transmission apparatus of claim 1 wherein the wireless device is powered by energy from the original signal.

4. The transmission apparatus of claim 1 wherein the variable impedance includes an array of impedances and respective switches.

5. The transmission apparatus of claim 1 wherein the decoder includes a backscattering coefficient to impedance value decoder.

6. The transmission apparatus of claim 1 wherein the information is an N-bit digital waveform.

7. The transmission apparatus of claim 6 wherein the N-bit digital waveform is applied to the decoder and then to the delta-sigma modulator to produce a control signal for the variable impedance that is related to the N-bit digital waveform.

8. The transmission apparatus of claim 7 wherein a change in the impedance value backscatters the original signal to produce the modulated signal, the modulated signal being a frequency offset form of the N-bit digital waveform.

9. The transmission apparatus of claim 7 wherein the control signal for the variable impedance switches an array of impedances within the variable impedance which changes the impedance value and thereby changes characteristics of the backscattering coefficient of the antenna.

10. The transmission apparatus of claim 1 wherein the information is a complex modulation signal.

11. The transmission apparatus of claim 10 wherein the complex modulation signal is offset in frequency from the original signal.

12. The transmission apparatus of claim 10 wherein the complex modulation signal is one of a GMSK signal, a nPSK signal, a 8PSK signal, a nQAM signal, and an OFDM signal.

13. The transmission apparatus of claim 10 wherein the complex modulation signal is represented by I+jQ, where I is an in-phase component, Q is a quadrature component, and j is a square root of −1.

14. The transmission apparatus of claim 10 wherein the complex modulation signal alternates between an in-phase signal and a quadrature signal via a control signal.

15. The transmission apparatus of claim 14 wherein the variable impedance switches between backscattering coefficients that are 90 degrees offset from each other depending on whether the complex modulation signal is the in-phase signal or the quadrature signal.

16. The transmission apparatus of claim 14 wherein the control signal is a clock signal.

17. The transmission apparatus of claim 14 and further comprising a digital signal generator.

18. The transmission apparatus of claim 17 wherein the digital signal generator applies a constant value signal to the in-phase signal and the quadrature signal.

19. The transmission apparatus of claim 17 wherein the digital signal generator applies sine and cosine wave signals to the in-phase signal and the quadrature signal, respectively.

20. The transmission apparatus of claim 10 wherein the complex modulation signal is a sum of an in-phase signal and a quadrature signal.

21. The transmission apparatus of claim 20 and further comprising a digital signal generator.

22. The transmission apparatus of claim 21 wherein the digital signal generator applies a constant value signal to the in-phase signal and the quadrature signal.

23. The transmission apparatus of claim 21 wherein the digital signal generator applies sine and cosine wave signals to the in-phase signal and the quadrature signal, respectively.

24. The transmission apparatus of claim 6 wherein the N-bit digital waveform is adjusted to compensate for errors in at least one of the decoder, the delta-sigma modulator, and the variable impedance.

25. The transmission apparatus of claim 1 wherein the variable impedance includes a filter for filtering noise generated by at least one of the decoder and the delta-sigma modulator.

26. The transmission apparatus of claim 1 wherein the modulated signal is an arbitrary signal.

27. The transmission apparatus of claim 1 wherein the wireless device is a radio frequency identification ("RFID") tag.

28. The transmission apparatus of claim 1 wherein the original signal is received from a RFID reader.

29. The transmission apparatus of claim 28 wherein the RFID reader is configured to correct for errors in at least one of the decoder, the delta-sigma modulator, and the variable impedance.

30. The transmission apparatus of claim 1 and further comprising a processor for controlling the transmission apparatus and memory for storing the information.

31. A transmission apparatus for a wireless device, comprising:
    an inductor for receiving an original signal and for transmitting by mutual inductance a modulated signal containing information from the wireless device;
    a variable impedance coupled to the inductor, the variable impedance having an impedance value;
    a delta-sigma modulator coupled to the variable impedance for modulating the impedance value, and thereby a value of the mutual inductance, in accordance with the information to generate the modulated signal; and,
    a decoder coupled to the delta-sigma modulator for generating the impedance value from the information.

32. The transmission apparatus of claim 31 wherein the variable impedance is coupled in parallel with the inductor.

33. The transmission apparatus of claim 31 wherein the wireless device is powered by energy from the original signal.

34. The transmission apparatus of claim 31 wherein the variable impedance includes an array of impedances and respective switches.

35. The transmission apparatus of claim 31 wherein the information is an N-bit digital waveform.

36. The transmission apparatus of claim 35 wherein the N-bit digital waveform is applied to the decoder and then to the delta-sigma modulator to produce a control signal for the variable impedance that is related to the N-bit digital waveform.

37. The transmission apparatus of claim 36 wherein the modulated signal is a frequency offset form of the N-bit digital waveform.

38. The transmission apparatus of claim 36 wherein the control signal for the variable impedance switches an array of impedances within the variable impedance which changes the impedance value.

39. The transmission apparatus of claim 31 wherein the information is a complex modulation signal.

40. The transmission apparatus of claim 39 wherein the complex modulation signal is offset in frequency from the original signal.

41. The transmission apparatus of claim 39 wherein the complex modulation signal is one of a GMSK signal, a nPSK signal, a 8PSK signal, a nQAM signal, and an OFDM signal.

42. The transmission apparatus of claim 39 wherein the complex modulation signal is represented by I+jQ, where I is an in-phase component, Q is a quadrature component, and j is a square root of −1.

43. The transmission apparatus of claim 39 wherein the complex modulation signal alternates between an in-phase signal and a quadrature signal via a control signal.

44. The transmission apparatus of claim 43 wherein the variable impedance switches between impedance values that are 90 degrees offset from each other depending on whether the complex modulation signal is the in-phase signal or the quadrature signal.

45. The transmission apparatus of claim 43 wherein the control signal is a clock signal.

46. The transmission apparatus of claim 43 and further comprising a digital signal generator.

47. The transmission apparatus of claim 46 wherein the digital signal generator applies a constant value signal to the in-phase signal and the quadrature signal.

48. The transmission apparatus of claim 46 wherein the digital signal generator applies sine and cosine wave signals to the in-phase signal and the quadrature signal, respectively.

49. The transmission apparatus of claim 39 wherein the complex modulation signal is a sum of an in-phase signal and a quadrature signal.

50. The transmission apparatus of claim 49 and further comprising a digital signal generator.

51. The transmission apparatus of claim 50 wherein the digital signal generator applies a constant value signal to the in-phase signal and the quadrature signal.

52. The transmission apparatus of claim 50 wherein the digital signal generator applies sine and cosine wave signals to the in-phase signal and the quadrature signal, respectively.

53. The transmission apparatus of claim 35 wherein the N-bit digital waveform is adjusted to compensate for errors in at least one of the decoder, the delta-sigma modulator, and the variable impedance.

54. The transmission apparatus of claim 31 wherein the variable impedance includes a filter for filtering noise generated by at least one of the decoder and the delta-sigma modulator.

55. The transmission apparatus of claim 31 wherein the modulated signal is an arbitrary signal.

56. The transmission apparatus of claim 31 wherein the wireless device is a radio frequency identification ("RFID") tag.

57. The transmission apparatus of claim 31 wherein the original signal is received from a RFID reader.

58. The transmission apparatus of claim 57 wherein the RFID reader is configured to correct for errors in at least one of the decoder, the delta-sigma modulator, and the variable impedance.

59. The transmission apparatus of claim 31 and further comprising a processor for controlling the transmission apparatus and memory for storing the information.

60. The transmission apparatus of claim 1 wherein the delta-sigma modulator is one of a low-pass delta-sigma modulator and a band-pass delta-sigma modulator.

61. The transmission apparatus of claim 1 wherein the delta-sigma modulator is a single bit delta-sigma modulator.

62. The transmission apparatus of claim 1 wherein the delta-sigma modulator switches the impedance value between at least two states.

63. The transmission apparatus of claim 31 wherein the delta-sigma modulator is one of a low-pass delta-sigma modulator and a band-pass delta-sigma modulator.

64. The transmission apparatus of claim 31 wherein the delta-sigma modulator is a single bit delta-sigma modulator.

65. The transmission apparatus of claim 31 wherein the delta-sigma modulator switches the impedance value between at least two states.

* * * * *